(12) United States Patent
McCormack et al.

(10) Patent No.: US 9,015,322 B2
(45) Date of Patent: Apr. 21, 2015

(54) ACCESS TO RESOURCES IN A VIRTUAL ENVIRONMENT

(75) Inventors: Tony McCormack, Galway (IE); Neil O'Connor, Galway (IE); Joseph Smyth, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 1117 days.

(21) Appl. No.: 12/346,336

(22) Filed: Dec. 30, 2008

(65) Prior Publication Data
US 2010/0169486 A1    Jul. 1, 2010

(51) Int. Cl.
| | | |
|---|---|---|
| G06F 15/173 | (2006.01) |
| H04L 12/54 | (2013.01) |
| H04L 12/801 | (2013.01) |
| H04L 12/911 | (2013.01) |
| H04L 12/861 | (2013.01) |
| H04L 29/08 | (2006.01) |
| H04L 29/06 | (2006.01) |

(52) U.S. Cl.
CPC ............ *H04L 12/5695* (2013.01); *H04L 47/12* (2013.01); *H04L 47/741* (2013.01); *H04L 47/821* (2013.01); *H04L 49/90* (2013.01); *H04L 67/322* (2013.01); *H04L 67/1002* (2013.01); *H04L 67/38* (2013.01); *H04L 67/1012* (2013.01)

(58) Field of Classification Search
CPC ........ H04L 65/60; H04L 67/322; H04L 41/50
See application file for complete search history.

(56) References Cited

U.S. PATENT DOCUMENTS

| | | | |
|---|---|---|---|
| 6,189,033 B1 * | 2/2001 | Jin et al. ........................ 709/225 |
| 6,789,203 B1 | 9/2004 | Belissent | |
| 6,880,156 B1 * | 4/2005 | Landherr et al. ............... 709/229 |
| 6,909,691 B1 * | 6/2005 | Goyal et al. ................... 709/229 |
| 8,127,235 B2 * | 2/2012 | Haggar et al. ................. 715/757 |
| 2002/0059378 A1 * | 5/2002 | Mustafa ......................... 709/205 |
| 2004/0064557 A1 * | 4/2004 | Karnik et al. ................. 709/225 |
| 2004/0133478 A1 | 7/2004 | Leahy | |
| 2006/0039381 A1 | 2/2006 | Anschultz | |
| 2008/0139315 A1 * | 6/2008 | O'Connor et al. ............... 463/42 |
| 2009/0106347 A1 * | 4/2009 | Harwood et al. ............. 709/203 |
| 2009/0131166 A1 * | 5/2009 | Smith et al. ..................... 463/31 |

OTHER PUBLICATIONS

International Search Report and Written Opinion in corresponding PCT/EP2009/009062.
International Preliminary Report on Patentability in PCT/EP2009/009062, issed Jul. 5, 2011.

* cited by examiner

*Primary Examiner* — Hieu Hoang
*Assistant Examiner* — Nam Tran
(74) *Attorney, Agent, or Firm* — Maldjian Law Group LLC; John Maldjian; William J. Connelly, III

(57) ABSTRACT

Access to a resource in a virtual environment is controllably granted by:
a) receiving, from a user of the environment, a request for access to the resource;
b) allocating the request to a queue of requests for the resource;
c) determining a maximum permissible rate of access of users to the resource;
d) providing a mechanism which is operable to grant users of the virtual environment with access to the resource at a rate no greater than the maximum permissible rate;
e) allocating requests from the queue to the mechanism at a controlled allocation rate no greater than the maximum permissible rate;
f) upon allocation of the request from the user to the mechanism, the mechanism granting the user with access to the resource within the virtual environment.

19 Claims, 4 Drawing Sheets

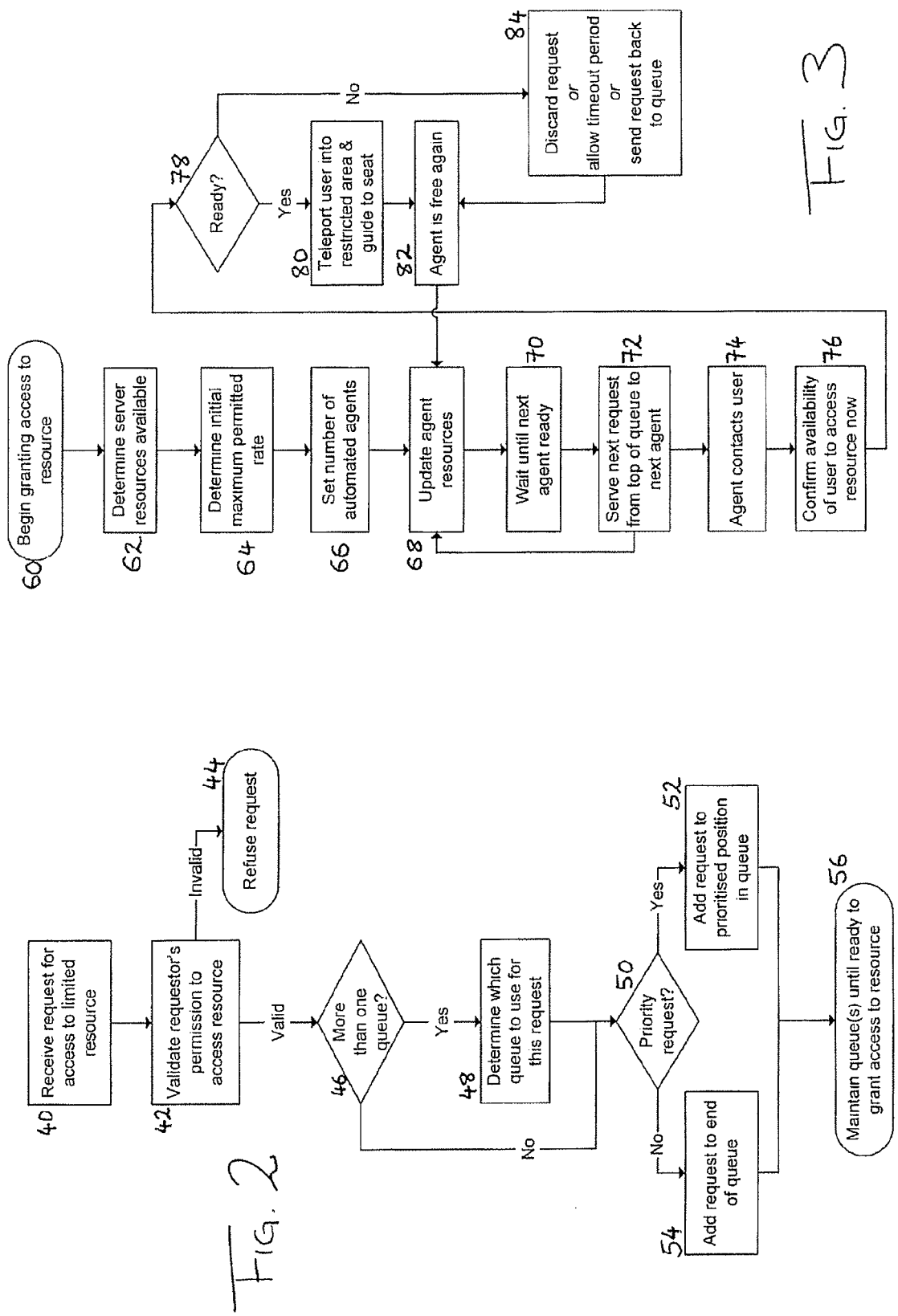

ACCESS TO RESOURCES IN A VIRTUAL ENVIRONMENT

TECHNICAL FIELD

This invention relates to virtual environments, also known as virtual worlds, and to the accessing of resources in such environments.

BACKGROUND ART

Virtual environments (referred to herein interchangeably as "virtual worlds") are typically implemented as server software accessible over a network, to which users may connect with suitable client software. Many users can connect simultaneously to interact with one another and with the environment represented by the virtual world. A well-known and currently popular example of such a virtual world is called Second Life, which is hosted by Linden Lab of San Francisco, Calif., further information being available at www.secondlife.com.

It is increasingly common to have events hosted in virtual environments. Examples include music concerts and other entertainment acts which users may "attend" by moving their character or avatar within the virtual environment to a location or venue (just as in the real world). The performance is provided as an audio and/or video feed which is experienced by the user within the virtual environment.

Problems can arise when large numbers of users want to simultaneously attend an event in a virtual environment. This is typically due to the fact that the event is managed by a server and because users at the same event typically draw on the same software and hardware resources. Generalising the problem, large numbers of users accessing the same server resource can cause server overload, and this can result in the server crashing or performance being adversely affected, so that users experience lag and stutter in the representation of and interaction with the virtual environment.

Even where an event is engineered to cater for a sufficient number of users (for example in the tens or hundreds of thousands), problems can arise from a sudden flood of access attempts occurring simultaneously, particularly if the demand is estimated incorrectly and there is a delay in bringing a sufficient number of additional servers online to cope with the demand.

DISCLOSURE OF THE INVENTION

There is provided a method of providing access to a resource in a virtual environment, comprising the steps of:
a) receiving, from a user of the environment, a request for access to the resource;
b) allocating the request to a queue of requests for the resource;
c) determining a maximum permissible rate of access of users to the resource;
d) providing a mechanism which is operable to grant users of the virtual environment with access to the resource at a rate no greater than the maximum permissible rate;
e) allocating requests from the queue to the mechanism at a controlled allocation rate no greater than the maximum permissible rate;
f) upon allocation of the request from the user to the mechanism, the mechanism granting the user with access to the resource within the virtual environment.

The method stores requests in a queue, and controls the rate at which they are released from the queue to an access mechanism so that this allocation rate is not greater than a maximum permissible rate. In this way, limits on the resource access rate can be enforced backwards onto the queue so that the loading of access requests to the resource never exceeds a desired rate.

Preferably, the request is received from a server associated with hosting the environment.

Alternatively, the request may be received from a channel unrelated to the hosting of the environment and is associated with the user.

For example, the request may be received as a telephone or email communication and contain an identifier from which the user may be identified.

The request may be allocated to a prioritized position within the queue, and in this way, preferential treatment can be given to groups of users or other access control policies enforced.

Preferably, the method further comprises the step of validating the request before allocating the request to the queue. In this way, invalid or spurious requests can be weeded out at an early stage, so that only those requests determined to be valid are actually referred to the access mechanism. As an example, if a user has a history of registering to access resources but failing to take up the offer of access when granted, then such a user can be blacklisted from accessing resources which have a high degree of competition for access.

Optionally, a number of queues may be maintained for the resource, and the method can further comprise the step of selecting a queue to which the request is allocated.

This will enable different types of access to be granted to different classes of user, or allow users to be segregated into fast and slow queues as appropriate. In a multinational community, it might be desired to grant access to a resource fairly to users from all countries on a per capita basis, for instance. This could be achieved by maintaining a queue for each country, with users being segregated into queues according to IP address ranges (used as a determinant of the geographical source of the request), and limits could be imposed on each queue to ensure that the quotas were respected. Many other scenarios will readily suggest themselves to the skilled person.

The maximum permissible rate of access can be received as a manual input. In this way, network administrators or supervisors can control the rate at which they wish to grant access to the resource.

Alternatively or additionally, the maximum permissible rate of access can be determined with reference to a measurable capacity associated with the resource.

Preferably, the resource is hosted by or accessible via one or more servers and the maximum permissible rate of access is determined at least in part with reference to the capacity of the one or more servers.

For example, the capacity of the one or more servers may be determined as a function of the number of servers hosting or providing access to the resource.

The method may also include the step of adjusting the maximum permissible rate of access as the measurable capacity associated with the resource is varied.

Thus, in a multi-server environment, the rate of access can be increased or decreased with the number of servers currently online, or can be varied in response to the server processing load available to host the resource in question.

The method may further include requesting the introduction of additional capacity in association with the resource in the event that the controlled allocation rate reaches a predetermined relationship with the maximum permissible rate.

The method may also or alternatively include the step of requesting the introduction of additional capacity in association with the resource in the event that a measured queue load reaches a threshold.

The request for the introduction of additional capacity can be effective to bring additional server capacity online to represent the resource to which access has been requested.

This option can be used to provide a self-correcting, feedback controlled server loading, with additional servers being automatically brought into play if there is a surge in demand for access to the resource, in contrast to the current situation in which this must be anticipated manually in advance. Until such servers are brought into play, the rate of access is artificially limited to the maximum preferred rate in order to safeguard the server load and the network traffic load.

The mechanism is preferably provided as a plurality of virtual agents or as a plurality of interfaces to human agents, wherein the controlled allocation rate is driven by the rate at which the agents become free to handle new requests from the queue.

In one embodiment, the mechanism is implemented as one or more virtual agents which are each configured to interact with one or more user(s) as the user(s) are granted access to the resource, the rate at which users are granted access to the resource being determined by the number of virtual agents and the number of users with whom each virtual agent interacts simultaneously.

The virtual agents can be provided as a plurality of instances of the same software-generated virtual agent.

It will be appreciated that using virtual agents, which interact with users as they are provided with access to the resource, allows the number of agents to be used as a rate limiting factor according to which the rate of operation of the mechanism is throttled.

Alternatively, the mechanism may be implemented as an interface enabling each of a plurality of human agents to interact with one or more user(s) as the user(s) are granted access to the resource, the rate at which the users are granted access to the resource being determined by the number of the human agents and the number of the users with whom each agent interacts simultaneously.

Preferably, the step of granting the user with access to the resource comprises altering the virtual environment as experienced by the user.

This can be done in many different ways, including bringing the user into a restricted "area" of the virtual environment, ensuring that a user is ready to take up a place by creating an interaction for the user, providing an automated or human-driven "usher" who accompanies the one or more users to their seats in a concert, and so on.

The environment can be altered in different ways for different classes of user, so that, for example, a concert by a single performer in a virtual environment is experienced by users from London as taking place in Wembley Stadium, while being experienced by users from New York as taking place in Madison Square Gardens, for instance.

There is also provided a computer program product comprising a computer readable medium encoding instructions which, when executed in a computing system, are effective to cause the computing system to perform the aforesaid methods of providing access to a resource in a virtual environment.

It will be appreciated that the methods disclosed herein are preferably computer-implemented, i.e. programmed into software which runs on suitably configured computer systems in order to provide the access to the resource. The computer systems may be stand-alone systems or distributed over a network. They can be general purpose personal computers or servers, or they can be dedicated, configured machines. The software can be provided on any computer-readable medium, including optical and magnetic disks, solid-state memories, hardwired in an electronic circuit, implemented as firmware, or provided as an electronic signal, e.g. over the Internet. For the queuing aspects of the method, appropriate contact center or call center systems may be adapted for use with the mechanism providing access to the virtual environment.

We also provide a system for providing access to a resource in a virtual environment, the system comprising:

a) an interface for receiving requests for access to the resource;

b) a queuing manager controlling a queue of the requests for access to the resource;

c) a memory storing a maximum permissible rate of access of users to the resource;

d) a mechanism configured to grant users of the virtual environment with access to the resource at a rate no greater than the maximum permissible rate;

wherein the queuing manager is configured to allocate requests from the queue to the mechanism at a controlled allocation rate no greater than the maximum permissible rate; and wherein the mechanism is effective to grant the user with access to the resource within the virtual environment upon allocation of the request from the user to the mechanism.

BRIEF DESCRIPTION OF THE DRAWINGS

The invention will now be further illustrated by the following descriptions of embodiments thereof, given by way of example only with reference to the accompanying drawings, in which:

FIG. 2 is a flowchart showing the allocation of a request to a queue;

FIG. 3 is a flowchart showing the granting of access in accordance with queued requests;

DETAILED DESCRIPTION OF PREFERRED EMBODIMENTS

Figure 1:
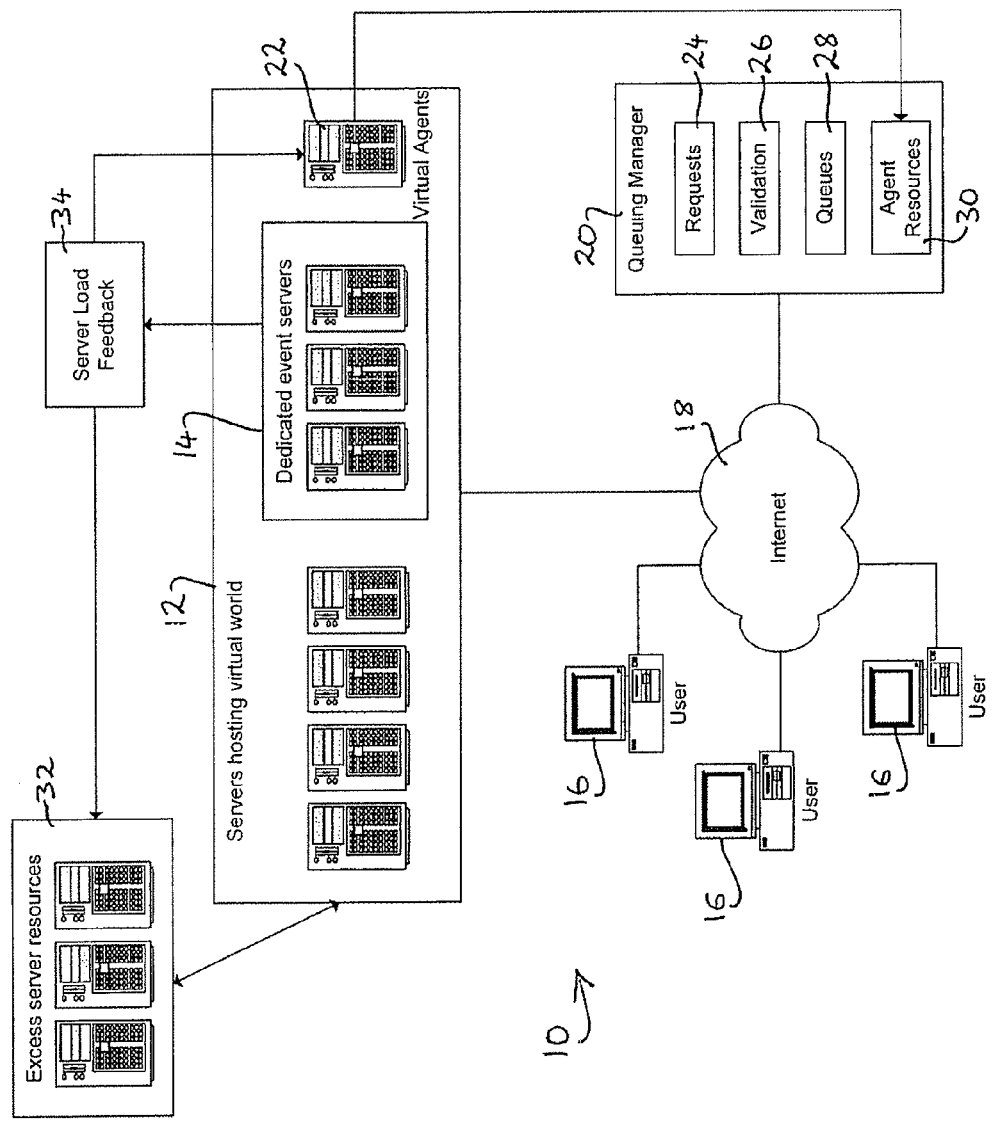
FIG. 1 is a block diagram architecture of a first system for providing access to a resource in a virtual environment.

In FIG. 1 there is indicated, generally at 10, a system for providing access to a resource in a virtual environment or virtual world hosted on a group of co-operating servers 12. In addition to hosting the environment itself, a subset 14 of servers is dedicated to providing an event for users to attend within the virtual environment, such as a political rally, a product launch, a concert, or an appearance by a celebrity. The servers 14 could equally provide access to any other sort of resource to which users would want access, such as an exclusive area of the virtual world, the use of an item or service within the virtual environment, access to a broadcast, and so on.

Users 16 access the virtual environment via the Internet 18 or any other suitable communications channel. As is well known, users are authenticated for access to the virtual environment, and can request access to limited resources within that environment (such as the event hosted by servers 14) using any appropriate in-character or out-of-character mechanism provided in the virtual environment. Requests for services can be conveyed through other channels, such as by purchasing an option in an account management website, or by verbally requesting, over the telephone, an operator associated with the management of the virtual environment to provide access. Such alternative channel requests need only be associated with the identity of the user to be acted on in exactly the same manner as in-world requests.

The handling of such requests and the granting or denial of access is managed by a queuing manager 20 and a further server 22 which hosts software (or virtual) agents to interact with users when granting access, in the manner which will now be described in conjunction with FIGS. 2 and 3.

Referring additionally to FIG. 2, a request for access to a limited resource is received in step 40. The request can be made in a parallel channel as described above, or can be made by the user interacting with the environment (such as by controlling a character or avatar), e.g. by issuing an appropriate command, verbally requesting access, making a particular gesture or moving into a marked area, interacting with an appropriate mechanism or in any other way. The user may not even be aware that the request has been made (e.g. if a world's administrators want to improve the quality of dialog typed by users, access to a limited resource might be granted as a prize, with users unknowingly submitting a request for that prize when key phrases are spoken).

Optionally, step 42, the request is validated to ensure that permission can be granted for that request. As a simple example, one might deny a request, step 44, to any user whose account was in arrears.

If valid, a determination is made as to whether there is more than one queue for such requests, decision 46. Multiple queues can be employed for many reasons, discussed previously, and if multiple queues are used then a determination is made as to which is the appropriate queue for the request under consideration, step 48.

Referring back to FIG. 1, it can be seen that the queuing manager maintains various resources, implemented using appropriately programmed software. Thus, a request database or memory 24 stores details of the requests themselves, supplemented as necessary with details of the user submitting the request, obtainable from the virtual world servers 12 or associated account records. Validation rules 26 determine whether or not the requests are valid. One or more queue structures 28 are also provided and maintained, with requests (or details of requests) being added to the queues and processed when they reach the top of such queues by the queue manager operating under programmed rules.

Returning to FIG. 2, if all requests are not given equal priority, a determination is made, decision 50, as to whether the request under consideration is a priority request. If so, the request is added to a queue at an appropriate position to take account of the assigned priority, step 52. Otherwise, step 54, it is added to the tail end of the queue in a "first come, first served" manner. Requests are held in the queue until it is almost time to grant access to the resource (e.g. shortly before a concert is about to begin), step 56, assuming that access to the resource is not already being granted. Any queuing technique can be used, including LIFO (last in, first out).

Referring to FIG. 3, when it is time to begin granting access to the resource, step 60, a determination is firstly made by virtual agent server 22 as to what server resources are available on the event servers 14 to accept users when granted access, step 62. The resources can be measured in terms of the number of servers, the expected server load, the available processing power or memory on the servers, or using any other appropriate metric.

Based on the expected server resources and knowledge of the access mechanism which will be provided to users, an initial maximum permitted rate of access to the resource is set in step 64. Based on this access rate, an appropriate number of automated agents is initialized, step 66. The number of agents required will depend on, among other things, the efficiency of such agents, the degree of interaction with users required to grant access in accordance with the wishes of the system designers, the number of users to whom an automated agent can grant access at one time, and so on.

The number and identity of the automated agents is updated, step 68, in an agent resources database 30 (FIG. 1). The queuing manager uses this set of agent resources to keep track of the agents to which it can assign requests from the queues 28. As agents are added or removed, and as they are assigned and complete requests, the records of agent resource database 30 are updated accordingly.

The maximum permitted rate of access can be enforced by limiting the number of agents available to handle requests, or it can be enforced by programming the agents to operate to a maximum aggregate rate of granting access. In this way, the queuing manager can be configured to assign requests from the queue(s) 28 to agent resources 30 as and when the agent resources are available (or as they indicate their availability if they are working at an artificially enforced rate).

Thus, in operation, the queuing manager waits until the next agent is ready, step 70 (FIG. 2) then serves the next request at the top of the queue to the next available agent, step 72, and the agent resources are updated to indicate that this agent is now servicing that request, step 68.

The automated agent, on being assigned a request, contacts the user, step 74. In practice this may be accomplished by the automated agent having an in-world presence or avatar, which is similar to a non-player character or NPC. This NPC can appear in the field of vision of the user who submitted the request (by appropriate co-operation between virtual agent server 22 and the overall hosting servers 12), and can interact with the user's character offering the opportunity to fulfil the pending request for access to a resource.

In the illustrated embodiment of FIG. 3, the user is asked to confirm his or her availability to access the resource when the offer is made (the user could be otherwise busy, or away from their keyboard, for instance). If the user is ready, decision 78, the agent instructs the hosting servers 12 to "teleport" the user and agent together into the restricted area—in other words, updating the virtual world location coordinates of the of the user, which may involve logging the user on to the dedicated event servers and those servers generating an appropriate environment, step 80.

Once the user has been granted access in accordance with whatever rules are set up by the system designers (it being appreciated that the notion of teleporting into a closed area is simply one of a myriad of possibilities for granting access to a resource), and assuming that the current aggregate rate of granting access is not exceeding the maximum permissible rate, the agent can indicate that it is free again for the next user, step 82, and this fact is notified back to the agent resources, 68, which will then note the agent is free in step 70, and so on.

If the user does not indicate readiness in decision 78, then several options are open to the agent, as indicated in step 84. For example, the request can simply be discarded, or the agent can await a timeout period for the user to indicate readiness to proceed, or the request can be re-queued, in whatever position is appropriate.

Figure 4:
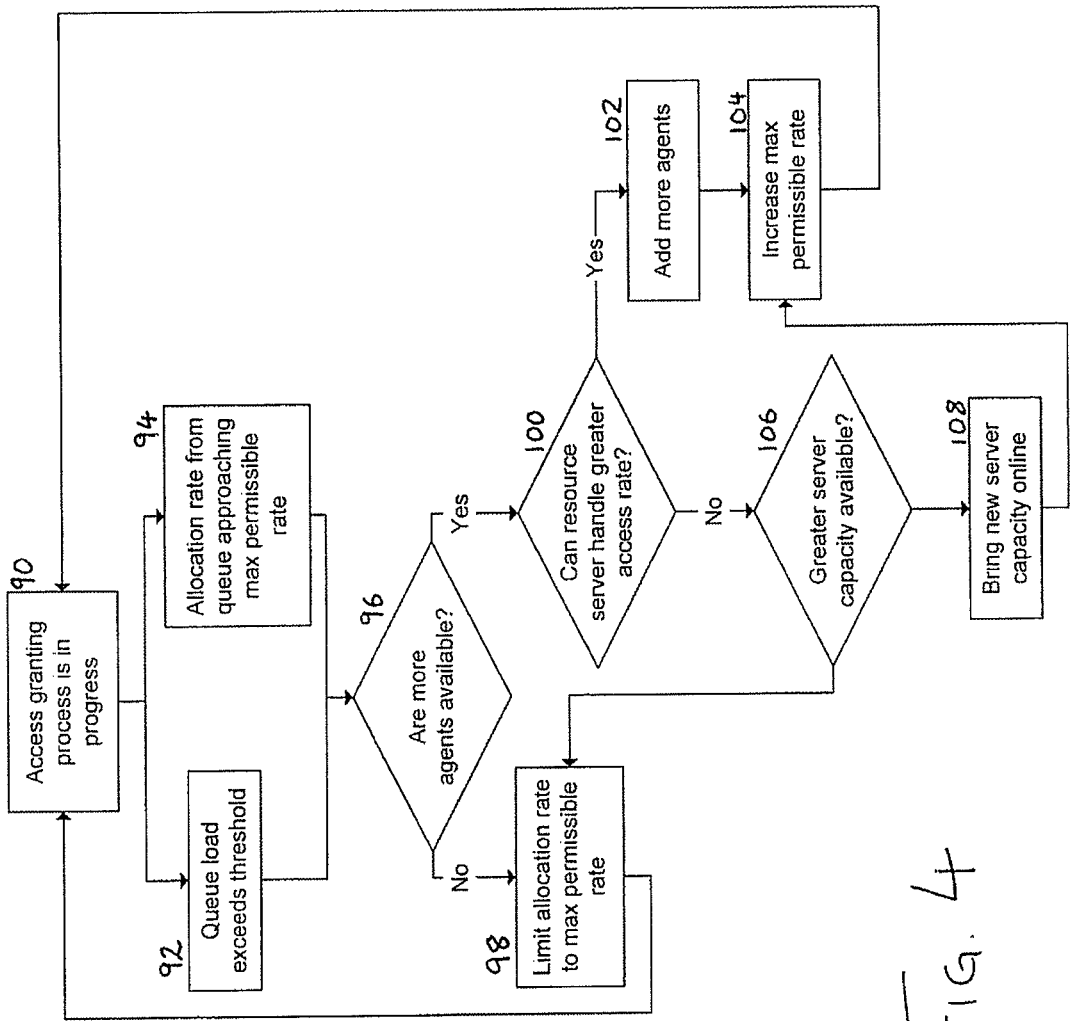
FIG. 4 is a flowchart showing the dynamic adjustment of the rate of granting access to a resource.

FIG. 4 illustrates options for adjusting the maximum permissible rate. In step 90, the access granting process of FIG.

2 is in progress. At some point, an alert is generated, such as an alert that the queue load exceeds a threshold (more users are seeking to access the resource than anticipated), step 92, or an alert that the allocation rate from the queue is approaching the maximum permissible rate (i.e. the automated agents are working as fast as they can to clear requests from the queue), step 94. Neither situation is necessarily problematic, but they each indicate that user waiting time could be decreased by increasing the maximum permitted rate.

A first determination 96 is made as to whether there are in fact any more agents available. While such a determination is more likely to be negative in embodiments employing live human agents, such as the embodiment of FIG. 5 described below, the automated agent server 22 could be working at maximum capacity and could be unable to instantiate any additional agents without the current performance taking an adverse hit. If no agents are available, the allocation rate from the queue to the agents is limited at the maximum permitted rate, step 98, as before and the process reverts to step 90.

However, if it is determined that more agents are available, this indicates that the maximum permitted rate might usefully be increased. This makes sense, however, only if the server(s) providing the resource in question can handle an increased access rate, decision 100. If they can handle more frequent access, then additional agents are added (or the work rate of the agents is increased), step 102, and the maximum permitted rate is increased to a new appropriate level, step 104.

If the current server resources could not handle the available extra agents, then a determination is made, decision 106, as to whether greater server capacity is available. Referring back to FIG. 1 momentarily, the current server load is measured by a feedback mechanism 34, and it can be seen that there are excess server resources 32 indicated as being available for addition to the live server capacity 12, 14 or 16.

In the context of decision 106 (FIG. 4), such servers will be added to the event server capacity, step 108. Upon an increase in server capacity, the max permissible rate can be increased directly, step 104, or the system can follow up by immediately adding more agents to take advantage of this additional capacity (branching to step 102 rather than 104, not shown).

Additional server capacity can be introduced not just by adding extra servers, but also by increasing resources available to the event servers, e.g. transferring other processes elsewhere on the network.

Figure 5:
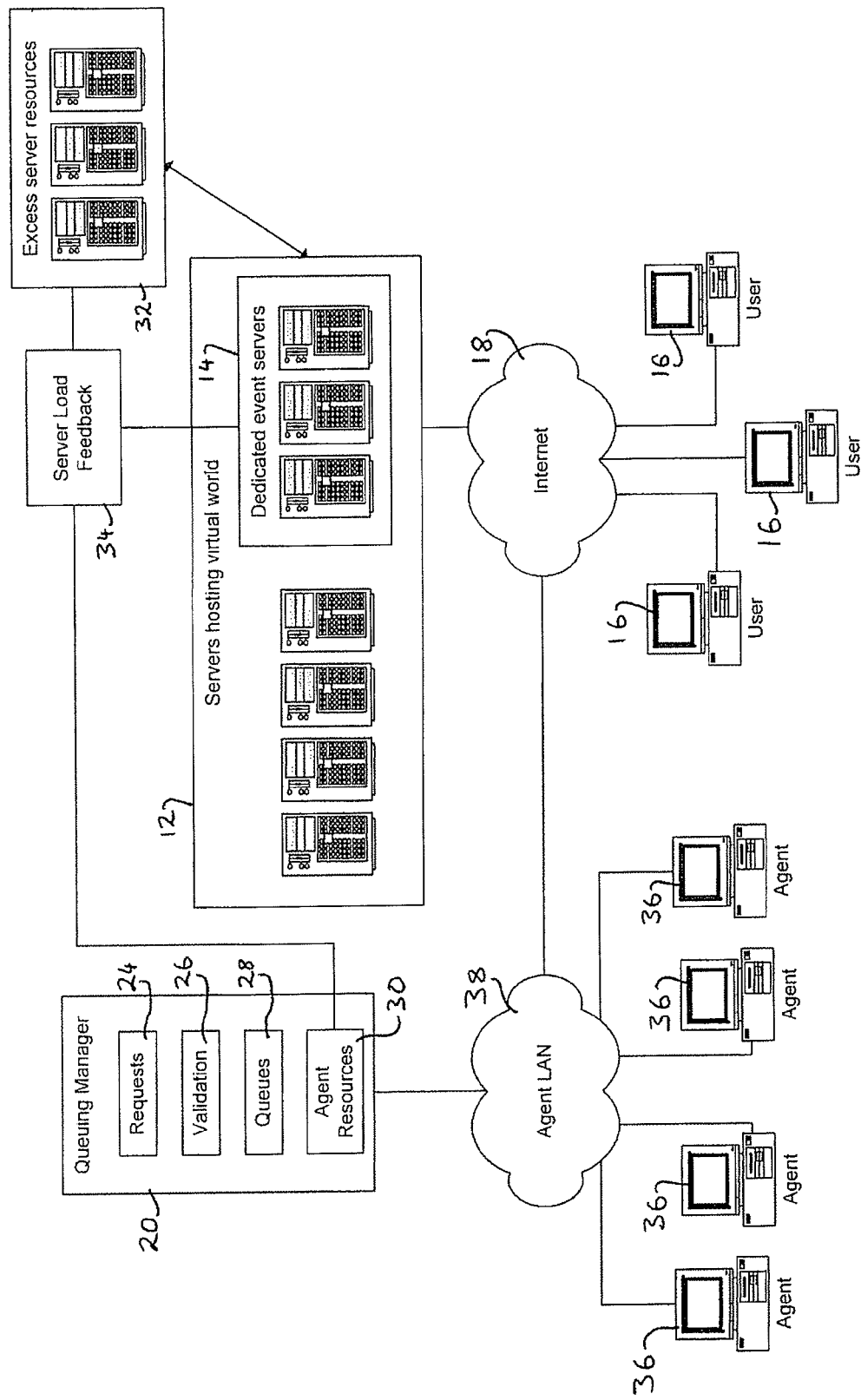
FIG. 5 is a block diagram architecture of a second system for providing access to a resource in a virtual environment.

Finally, FIG. 5 shows an alternative embodiment to that of FIG. 1 but in which like entities are indicated by like reference numerals for ease of understanding.

The automated or virtual agents of FIG. 1 are omitted in FIG. 5 in favor of a number (possible a very large number) of live human agents 36, indicated by workstations connected to an agent local area network (LAN) 38. Such agents can operate in similar fashion to the automated agents of FIG. 1, interacting with those users for whom they have been allocated requests from the queuing manager 20. The identity and status of each agent is recorded in the agent resources database 30, just as for the virtual agents. The agent workstations allow the agents to communicate with users in the virtual environment, and the rate at which they grant users access can be readily controlled by limiting access to the environment, or by throttling the allocation rate of requests to below the maximum permitted rate. The maximum permitted rate can also be reduced or increased by removing or adding agents to the pool of agents servicing requests from the queues 28.

The invention is not limited to the embodiments described herein which may be varied or modified without departing from the scope of the invention.

We claim:

1. A method comprising the steps of:
   a) providing a virtual world environment comprising a group of co-operating stand-alone servers hosting a plurality of simultaneously connected users and enabling said users to interact with one another within said virtual world environment,
   b) receiving, from a user of said virtual world environment, a request for access to a resource, wherein said resource resides within the virtual world environment;
   c) allocating said request to a queue of requests for said resource;
   d) determining a maximum permissible rate of access of users to said resource, wherein said resource is hosted by or accessible via one or more of the servers and wherein said maximum permissible rate of access is determined at least in part with reference to the capacity of said one or more servers;
   e) providing a mechanism which is operable to grant users of said virtual world environment with access to said resource at a rate no greater than said maximum permissible rate;
   f) allocating requests from said queue to said mechanism at a controlled allocation rate no greater than said maximum permissible rate; and
   g) upon allocation of said request from said user to said mechanism, said mechanism granting said user with access to said resource within the virtual world environment, and
   h) increasing the maximum permissible rate by requesting the introduction of additional capacity associated with said resource in the form of additional servers if there is a surge in demand for access to the resource;
   i) requesting the introduction of additional capacity in association with said resource in the event that a measured queue load of said queue reaches a threshold.

2. A method as claimed in claim 1, wherein said request is received from a server associated with hosting said environment.

3. A method as claimed in claim 1, wherein said request is received from a channel unrelated to the hosting of said environment and is associated with said user.

4. A method as claimed in claim 3, wherein said request is received as a telephone or email communication and contains an identifier from which said user may be identified.

5. A method as claimed in claim 1, wherein said request is allocated to a prioritized position within the queue.

6. A method as claimed in claim 1, further comprising the step of validating said request before allocating said request to said queue.

7. A method as claimed in claim 1, wherein a number of queues are maintained for said resource, and further comprising the step of selecting a queue to which said request is allocated.

8. A method as claimed in claim 1, wherein said maximum permissible rate of access is received as a manual input.

9. A method as claimed in claim 1, wherein said capacity of said one or more servers is determined as a function of the number of said one or more servers hosting or providing access to said resource.

10. A method as claimed in claim 1, further comprising the step of adjusting said maximum permissible rate of access as said measurable capacity associated with said resource is varied.

11. A method as claimed in claim 1, further comprising the step of requesting the introduction of additional capacity in association with said resource in the event that the controlled allocation rate reaches a predetermined relationship with the maximum permissible rate.

12. A method as claimed in claim 1, wherein said mechanism is provided as a plurality of virtual agents or as a plurality of interfaces to human agents, and wherein said controlled allocation rate is driven by the rate at which said agents become free to handle new requests from said queue.

13. A method as claimed in claim 1 wherein said mechanism is implemented as one or more virtual agents which are each configured to interact with one or more user(s) as the user(s) are granted access to the resource, the rate at which users are granted access to said resource being determined by the number of virtual agents and the number of users with whom each virtual agent interacts simultaneously.

14. A method as claimed in claim 13, wherein said virtual agents are provided as a plurality of instances of the same software-generated virtual agent.

15. A method as claimed in claim 13, wherein said mechanism is implemented as an interface enabling each of a plurality of human agents to interact with one or more user(s) as the user(s) are granted access to the resource, the rate at which said users are granted access to said resource being determined by the number of said human agents and the number of said users with whom each agent interacts simultaneously.

16. A method as claimed in claim 1, wherein the step of granting said user with access to said resource comprises altering the virtual environment as experienced by said user.

17. A method as claimed in claim 1, wherein said request is generated as a result of an online transaction.

18. A computer program product comprising a non-transitory computer readable medium encoding instructions which, when executed in a computing system, are effective to cause said computing system to perform a method by:
  a) providing a virtual world environment comprising a group of co-operating stand-alone servers hosting a plurality of simultaneously connected users and enabling said users to interact with one another within said virtual world environment,
  b) receiving, from a user of said virtual world environment, a request for access to a resource, wherein said resource resides within the virtual world environment;
  c) allocating said request to a queue of requests for said resource;
  d) determining a maximum permissible rate of access of users to said resource, wherein said resource is hosted by or accessible via one or more of the servers and wherein said maximum permissible rate of access is determined at least in part with reference to the capacity of said one or more servers;
  e) providing a mechanism which is operable to grant users of said virtual world environment with access to said resource at a rate no greater than said maximum permissible rate;
  f) allocating requests from said queue to said mechanism at a controlled allocation rate no greater than said maximum permissible rate; and
  g) upon allocation of said request from said user to said mechanism, said mechanism granting said user with access to said resource within the virtual world environment, and
  h) increasing the maximum permissible rate by requesting the introduction of additional capacity associated with said resource in the form of additional servers if there is a surge in demand for access to the resource;
  i) requesting the introduction of additional capacity in association with said resource in the event that a measured queue load of said queue reaches a threshold.

19. A system comprising:
  a) a virtual world environment comprising a group of co-operating stand-alone servers hosting a plurality of simultaneously connected users and enabling said users to interact with one another within said virtual world environment,
  b) an interface for receiving requests for access to a resource, wherein said resource resides within the virtual world environment;
  c) a queuing manager controlling a queue of said requests for access to said resource;
  d) a memory storing a maximum permissible rate of access of users to said resource, wherein said resource is hosted by or accessible via one or more of the servers and wherein said maximum permissible rate of access is determined at least in part with reference to the capacity of said one or more servers;
  e) a mechanism configured to grant users of said virtual world environment with access to said resource at a rate no greater than said maximum permissible rate;
  f) a mechanism configured to increase the maximum permissible rate by requesting the introduction of additional capacity associated with said resource in the form of additional servers if there is a surge in demand for access to the resource, and
  g) a mechanism configured to request the introduction of additional capacity in association with said resource in the event that a measured queue load of said queue reaches a threshold,
  wherein said queuing manager is configured to allocate requests from said queue to said mechanism at a controlled allocation rate no greater than said maximum permissible rate, and wherein said mechanism is effective to grant said user with access to said resource within the virtual world environment upon allocation of said request from said user to said mechanism.

* * * * *